(12) United States Patent
Chen

(10) Patent No.: US 7,387,755 B2
(45) Date of Patent: Jun. 17, 2008

(54) METHOD OF MAKING A CERAMIC COMPOSITE

(75) Inventor: Jack C. Chen, Getzville, NY (US)

(73) Assignee: Praxair Technology, Inc., Danbury, CT (US)

( * ) Notice: Subject to any disclaimer, the term of this patent is extended or adjusted under 35 U.S.C. 154(b) by 351 days.

(21) Appl. No.: 11/083,945

(22) Filed: Mar. 21, 2005

(65) Prior Publication Data

US 2006/0208377 A1 Sep. 21, 2006

(51) Int. Cl.
*B29C 29/00* (2006.01)

(52) U.S. Cl. .................. 264/112; 264/241; 264/125

(58) Field of Classification Search ............... 264/112, 264/120, 125, 650, 43; 156/89.11, 89.12, 156/89.16, 242
See application file for complete search history.

(56) References Cited

U.S. PATENT DOCUMENTS

| | | | | |
|---|---|---|---|---|
| 4,957,673 A * | 9/1990 | Schroeder et al. | ........... | 264/643 |
| 5,439,706 A | 8/1995 | Richards et al. | ............ | 427/244 |
| 5,711,833 A * | 1/1998 | Apte et al. | ............... | 156/89.27 |
| 6,165,431 A * | 12/2000 | Mackay et al. | ............. | 423/219 |
| 6,242,163 B1 * | 6/2001 | Stampfl et al. | ............. | 430/322 |
| 6,411,495 B2 * | 6/2002 | Wada et al. | ............. | 361/321.4 |
| 6,485,591 B1 * | 11/2002 | Nakao et al. | ............ | 156/89.12 |
| 6,511,564 B2 * | 1/2003 | Nakamura et al. | ........ | 156/89.16 |
| 6,524,421 B1 | 2/2003 | Chen et al. | ................ | 156/245 |
| 6,638,575 B1 | 10/2003 | Chen et al. | ................. | 427/453 |
| 6,653,009 B2 * | 11/2003 | Wang et al. | .................. | 429/30 |
| 6,764,624 B2 * | 7/2004 | Saito et al. | ................ | 264/115 |
| 7,244,316 B2 * | 7/2007 | Jain et al. | ..................... | 134/28 |
| 2003/0170160 A1 * | 9/2003 | Morita et al. | .............. | 423/247 |
| 2003/0209534 A1 * | 11/2003 | Ferguson | .................... | 219/548 |
| 2004/0197641 A1 * | 10/2004 | Visco et al. | ................ | 429/137 |
| 2004/0226832 A1 * | 11/2004 | Jain et al. | .................... | 205/784 |
| 2007/0134532 A1 * | 6/2007 | Jacobson et al. | ............. | 429/32 |

OTHER PUBLICATIONS

Pal et al., "Electrochemical Vapor Deposition Of Yttria-Stabilized Zirconia Films", First International Symposium on Solid Oxide Fuel Cells, vol. 89-11 (1989) pp. 41-45.

* cited by examiner

*Primary Examiner*—Carlos Lopez
(74) *Attorney, Agent, or Firm*—David M. Rosenblum

(57) ABSTRACT

A method of forming one or more ceramic layers on the substrate in which one layer containing ceramic particles is laminated onto the surface of the substrate that is completely formed. The layer that is applied to the substrate contains voids between the ceramic particles. The particles are sintered into a coherent mass, thereby to form the ceramic layer or layers by heating the layer while simultaneously applying pressure to the layer in a direction normal to the surface of the substrate until the sintering is complete. The layer is heated to a temperature that is below the pressureless sintering temperature of the particles and the temperature is sufficient to allow the movement of the particles upon application of the pressure to force the particles into physical contact with one another and such that the voids are substantially removed.

12 Claims, 1 Drawing Sheet

METHOD OF MAKING A CERAMIC COMPOSITE

FIELD OF THE INVENTION

The present invention relates to a method for forming at least one ceramic layer on a substrate in which one or more layers that comprise ceramic particles are laminated onto the surface of the substrate and the ceramic particles are sintered into a coherent mass upon application of a pressure and a temperature that is below the pressureless sintering temperature.

BACKGROUND OF THE INVENTION

There are many industrial applications that require a thin ceramic layer or layers be formed on a substrate. For instance, inorganic membranes possess thin porous ceramic layers supported by porous substrates. Oxygen transport membranes are another class of applications in which a thin dense layer of an oxygen ion conducting material is supported on one or more porous substrates. The substrates can be metal or a ceramic. Generally, the ceramic material used in an oxygen transport membrane is a perovskite that is capable of conducting both oxygen ions and electrons at elevated temperatures and upon application of a partial pressure differential to separate oxygen from an oxygen containing feed. Certain ceramic materials are capable of conducting protons and can similarly be used for hydrogen separation. A closely related art involves fuel cells that utilize a very thin electrolyte layer that is formed of a ceramic that is also capable of conducting oxygen ions. The electrolyte layer is sandwiched between electrodes to conduct electrons generated through ionization of the oxygen and recombination of oxygen ions to a load.

Several methods have been developed forming ceramic layers on substrates, including organometallic chemical vapor deposition, electrochemical vapor deposition, colloidal/slurry coating, tape isopressing, sol-gel and plasma spray. U.S. Pat. No. 5,439,706 discloses an organometallic chemical vapor deposition method to prepare thin films on multicomponent and oxides for use in inorganic membranes. Such a process involves expensive and complex equipment and often the use of toxic and expensive precursor materials.

Plasma spraying is a fast, cost-effective method for fabricating dense oxygen or hydrogen transport membrane coatings that are free of microcracks on dense or porous substrates. Plasma spraying involves spraying a molten powder of metal or metal oxide onto the surface of a substrate using a plasma spray gun. An example is shown in U.S. Pat. No. 6,638,575. The problem with plasma spraying is that it is not easy to achieve very thin gas tight dense layers on porous supports.

U.S. Pat. No. 6,524,421 discloses a tape isopressing method that combines conventional tape casting and cold isopressing techniques to fabricate oxygen transport membranes that utilize a porous substrate to support a dense layer. A tape containing the ceramic is applied to the substrate and a green form is produced by the cold isopressing. The green form is then fired to produce the finished article. Colloidal/slurry coating techniques involve the formation of a slip containing the ceramic particles to be applied. In such method, a porous substrate to serve as a support is dipped in the slip to form a thin coating that can subsequently be processed from its green state into a thin dense layer. The disadvantage of both of such techniques is that they require a close matching of shrinkage between the coating and the substrate upon firing. In the absence of such close matching the dense layer will have cracks and be incapable of performing in its intended function.

As will be discussed the present invention provides a method that allows very thin, film-like layers to be formed on substrate without expensive equipment or the use of potentially toxic precursors with the result that that the ceramic layer or layers incorporated into a composite structure are formed in the finished article without cracks or other major defects.

SUMMARY OF THE INVENTION

The present invention provides a method of forming at least one ceramic layer in a substrate. In accordance with the method, the at least one layer, which comprises ceramic particles, is laminated onto a surface of the substrate. The substrate is in a finished state and the layer contains voids between the ceramic particles upon application. The term "finished state" means herein and in the claims that the substrate has been sintered to at least 95 percent by firing in case of a ceramic or is a metal substrate that requires no substantial steps in completing its formation. The particles are sintered into a coherent mass, thereby to form the at least one ceramic layer, by heating the layer by simultaneously applying a pressure to the layer in a direction normal to the surface of the substrate until the sintering is complete. The layer is heated to a temperature that is below the pressureless sintering temperature of the particles and the temperature is sufficient to allow movement of the particles upon application of the pressure to force the particles into physical contact within one another and such that the voids are substantially removed.

After a ceramic layer is formed in this manner, it is crack-free. As will be discussed, very thin crack-free dense layers can be fabricated in such a manner and various ceramic composites can be formed in a simple and less expensive manner than the prior art.

The pressure that is applied during sintering can be a final pressure. The at least one layer can be laminated by positioning a tape cast film containing the ceramic particles onto the surface of the substrate and applying an initial pressure against the tape cast film. The at least one layer and the substrate can be inserted into a graphite die having end walls to restrain expansion of the at least one layer in a direction parallel to the substrate surface. A cover is situated against the at least one layer and within the end walls of the die. The final pressure is then exerted on the cover. Additionally, the temperature that is exerted during sintering can be a final temperature. The die can be heated to an initial temperature and then to an intermediate pressure, between the initial pressure and the final pressure to burn out binders within the tape cast film. Thereafter the die can be heated to the final temperature.

The substrate can be porous or perforated. The ceramic material can be capable of conducting oxygen ions at an elevated temperature and the at least one ceramic layer can include a substantially gas tight dense layer. The at least one ceramic layer can include at least an outer layer to form the substantially gas tight dense layer and an inner layer situated against the surface of the substrate and between the outer layer and the surface of the substrate. The inner layer can contain pore forming materials mixed with the ceramic particles that are capable of removal through combustion thereof so that the inner layer after sintering and combustion of the pore forming materials has an open porous structure.

The substrate can be composed of a metal or metal alloy or a metal oxide such as a ceramic. The substrate can be an oxide-dispersed strengthened metal alloy. The substrate can be between about 1 and about 3 millimeters thick and the dense layer can be between about 10 microns and about 200 microns thick.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

DETAILED DESCRIPTION

Figure 1:
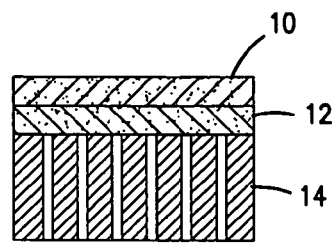
FIG. 1 is a schematic illustration of an initial fabrication step in accordance with the present invention.
Figure 2:
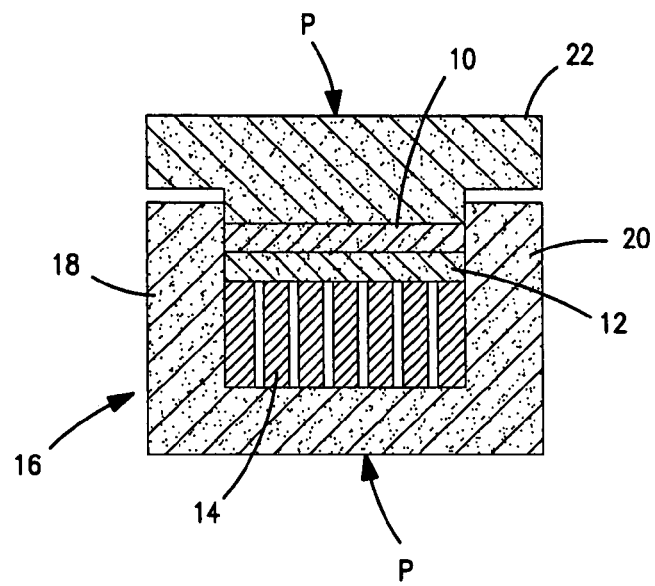
FIG. 2 is a schematic illustration of a processing step in accordance with the present invention that involves the utilization of a graphite die.
Figure 3:
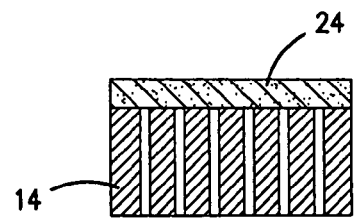
FIG. 3 is a schematic sectional view of a composite membrane formed in a method in accordance with the present invention.

With reference to FIGS. 1 through 3, a method in accordance with the present invention is disclosed in connection with the manufacture of an oxygen transport membrane. It is understood that this is for exemplary purposes only and that the invention is not limited to such application and could be used in the manufacture of other composite forms.

With specific reference to FIG. 1, layers 10 and 12 are formed from ceramic tapes that are prepared in a conventional manner. Briefly, such tapes are prepared by combining ceramic powder with a binder and then after milling, the slip is cast onto Mylar tape. The thickness of the cast film is controlled with a doctor blade. Extremely thin films can be obtained in such manner. The layers 10 and 12 are sequentially applied to a porous or perforated substrate 14 that can be a ceramic or a metal or a metal alloy or an oxide-disbursed strengthened metal alloy. The perforated substrate 14 is in a finished state, that is, as indicated above, it is a metal or metal oxide substrate with or without pores or a sintered ceramic. It is understood in applications of the present invention to the formation of ceramic layers on metal substrates, such as for insulation, the substrate might not be porous.

It is intended that the layers 10 and 12 will form a single dense layer. The two layers are used to insure that no defects will occur in the dense layer that is intended to be formed from the layers 10 and 12. It is to be understand, however that only a single layer of tape cast film could be used in accordance with the present invention. Furthermore, although application of a layer or layers is illustrated herein as being carried out by the application of tape cast films to a substrate, there are other possibilities such as slurry coating to produce a layer or layers that contain ceramic particles onto a substrate.

Another possibility is that layer 10 could be an outer layer to form a dense layer, while layer 12, located between outer layer 10 and the surface of substrate 14, could contain fugitive pore formers, such as carbon, to be burned out during a subsequent stage of fabrication. This would result in inner layer 12 having an open porous network to allow the passage of gas through the resultant porous layer and the porous substrate 14. Intermediate layers having pore formers could also be used to produce a gradation in the pore size.

Layers 10 and 12 are laminated to substrate 14 by the application of pressure. With reference to FIG. 2, the composite of laminated layers 10 and 12 and porous substrate 14 is loaded into a graphite die 16 having end walls 18 and 20 and a cover 22 that can be mechanically forced against layers 10 and 12 and substrate 14 to exert a pressure within die 16. The pressure can be applied by pressurizing the furnace to apply the pressure "P".

The die 16 is heated in an inert atmosphere to an initial temperature and pressure which is held for a limited amount of time to burn out the binder that was used in forming the layers 10 and 12. The temperature is then increased along with the pressure that is held for a sufficient time period to allow the layers 10 and 12 to sinter into a coherent mass such as dense layer 24 illustrated in FIG. 3. In this regard, as used herein and in the claims, a dense layer is one that is gas tight and that has been sintered to at least 95 percent of possible densification. In case of an oxygen transport element, the dense layer 24 can have a thickness of between about 10 microns and about 200 microns. The thickness of the dense layer is controlled by the number and the thickness of each tape cast film.

If a layer or layers containing ceramic particles were applied to a metal substrate or sintered ceramic with the aim of forming a thin dense layer and the layers were then fired to burn out binders and then simply heated to sinter the particles, cracks would form in the resulting dense layer. In accordance with the present invention, after layers 10 and 12 are laminated to substrate 14, as indicated in FIG. 1, there still remain voids between the ceramic particles. By exerting pressure in a direction normal to the surface of the substrate after lamination at a temperature that is below the pressureless sintering temperature, these voids are removed by action of the pressure. As a result, the dense layer 24 is formed without cracks or other defects. The time and pressure required for sintering is entirely material dependent. However, as a starting point, a temperature can be used that is about 70 percent of the pressureless sintering temperature. The pressureless sintering temperature as used herein means the sintering temperature that will be sufficient to sinter the ceramic upon heating and without added pressure. In this regard, a pressure of 4000 psig will work in most instances. However, optimally, pressures between about 2000 psig and about 4000 psig will be adequate, again depending upon the material.

The advantage of die 16 is that end walls 18 and 20 restrain movement of the layers in a direction parallel to the surface of the substrate to allow for precise control of thickness of dense layer 24. It is to be noted, however, that it is possible to conduct a method in accordance with the present invention in which such movement in a direction parallel to the surface of the substrate is not controlled.

While the finished composite is illustrated as a flat plate. Other types of dies are possible in which tubular forms can be fabricated with isopressing techniques that involve providing a metallic mandrel to support a porous tube, either formed of a sintered ceramic, metal, or metal alloy, applying the tape cast film to the outer periphery of the outer tube and then applying a foil to the outer surface of the tape cast film. A pressurized furnace known in the art is then used in which the cylindrical support or substrate is heated to the pressureless sintering temperature and gas pressure is exerted upon the foil for a sufficient time to cause the layer or layers to sinter.

The following is an example of a method that was used in forming an oxygen transport membrane in accordance with the present invention. As an initial step, a slurry was prepared by combining approximately 65 parts of ceramic powder to 35 parts of binder. Specifically, approximately 25.2 grams of lanthanum strontium iron titanium oxide powder was combined with 25.2 grams of gadolinium doped ceria and approximately 12.6 grams of silver powder. Added to this mixture, about 37.0 grams of binder and 200 grams of ⅜" mill metal balls were placed in a 125 milliliter NALGEN bottle and allowed to roll in a jar mill for about 16 hours. The mixture was then filtered through a 125 mesh monofilament nylon cloth and tape cast onto Mylar film. The gap was controlled by a doctor blade to obtain a green thickness of approximately 40 and about 15 microns.

The substrate is an oxide-dispersed strengthened metal alloy that was perforated by e-beam drilling techniques. This formed channels of approximately 150 microns in diameter.

Layers of the film were then stacked on top of the perforated substrate followed by a pressing at about 500 psi to laminate the layers onto the substrate. The resultant composite was then placed into a graphite die such as illustrated in FIG. 2 and the loaded die was then placed into a furnace. The furnace was heated at a rate of about 1.3° C. per minute, in nitrogen, to a temperature of about 450° C. at a pressure of 1000 psi. This pressure and temperature were held for 30 minutes to remove the organic binder. The temperature ramp was then increased to about 2° C. per minute until a target temperature of about 950° C. was reached. The pressure was increased to 2000 psi and the temperature and pressure were held constant for 2 hours to allow the film to fully sinter. The furnace was then cooled from 950° C. to about 600° C. at about 3.2° C. per minute and the pressure was decreased to 1000 psi. Finally, the resultant sintered composite was cooled from 600° C. to room temperature at a rate of about 1.8° C. per minute with a pressure slowly decreasing upon cooling. The resultant film has a thickness of about 50 microns.

While the present invention has been described with reference to a preferred embodiment, as will occur to those skilled in the art, numerous, changes, additions and omissions can be made without departing from the spirit and the scope of the present invention.

I claim:

1. A method of forming at least one ceramic layer on a substrate, said method comprising:

laminating at least one layer comprising ceramic particles onto a surface of the substrate;

the substrate being in a finished state and the at least one layer containing voids between ceramic particles; and sintering the particles into a coherent mass, thereby to form the at least one ceramic layer, by heating the at least one layer while simultaneously applying a pressure to the at least one layer in a direction normal to the surface of the substrate until the sintering is complete;

the at least one layer being heated to a temperature that is below the pressureless sintering temperature of the ceramic particles and the temperature being sufficient to allow movement of the particles upon application of the pressure to force the particles into physical contact with one another and such that the voids are substantially removed.

2. The method of claim 1, wherein:
   the pressure is a final pressure; and
   the at least one layer is laminated by positioning a tape cast film containing the ceramic particles onto the surface and applying an initial pressure against the tape cast film.

3. The method of claim 2, wherein:
   the at least one layer and substrate are inserted into a graphite die having end walls to restrain expansion of the at least one layer in a direction parallel to the substrate surface and a cover situated against the at least one layer and within the end walls; and
   the final pressure is exerted on the cover.

4. The method of claim 3, wherein:
   the temperature to which the at least one layer is heated is a final temperature; and
   the die is heated to an initial temperature and to an intermediate pressure, between the initial pressure and final pressure, to burn out binders within the tape cast film and then to the final temperature.

5. The method of claim 1 or claim 4, wherein:
   the substrate is porous or perforated;
   the ceramic material is capable of conducting oxygen ions at an elevated temperature; and
   the at least one layer is utilized to form a substantially gas tight dense layer.

6. The method of claim 5, wherein:
   the at least one layer includes at least an outer layer to form the substantially gas tight dense layer and an inner layer situated against the surface of the substrate and between the outer layer and the surface of the substrate; and
   the inner layer containing pore forming materials mixed with the ceramic particles that are capable of removal through combustion thereof so that said inner layer after sintering and combustion of the pore forming materials has an open porous structure.

7. The method of claim 5, wherein the substrate is composed of a metal or metal alloy or a metal oxide.

8. The method of claim 7, wherein the substrate is an oxide-dispersed strengthened metal alloy.

9. The method of claim 5, wherein:
   the substrate is between about 1 and about 3 millimeters thick; and
   the dense layer is between about 10 microns and about 200 microns thick.

10. The method of claim 5, wherein the substrate is composed of a metal or metal alloy or metal oxide.

11. The method of claim 7, wherein the substrate is an oxide-dispersed strengthened metal alloy.

12. The method of claim 11, wherein:
   the at least one layer includes at least an outer layer to form the substantially gas tight dense layer and an inner layer situated against the surface of the substrate and between the outer layer and the surface of the substrate; and
   the inner layer containing pore forming materials mixed with the ceramic particles that are capable of removal through combustion thereof so that said inner layer after sintering and combustion of the pore forming materials has an open porous structure.

* * * * *